United States Patent
Morbach

(10) Patent No.: US 11,359,688 B2
(45) Date of Patent: Jun. 14, 2022

(54) HYBRID FRICTION LINING MATERIAL, BRAKE LININGS PRODUCED FROM SAME AND METHOD FOR PRODUCING SAME

(71) Applicant: FEDERAL-MOGUL FRICTION PRODUCTS GMBH, Bad Camberg (DE)

(72) Inventor: Marcus Morbach, Niedererbach (DE)

(73) Assignee: FEDERAL-MOGUL FRICTION PRODUCTS GMBH, Bad Camberg (DE)

( * ) Notice: Subject to any disclaimer, the term of this patent is extended or adjusted under 35 U.S.C. 154(b) by 179 days.

(21) Appl. No.: 16/955,399

(22) PCT Filed: Sep. 6, 2018

(86) PCT No.: PCT/EP2018/073994
§ 371 (c)(1),
(2) Date: Jun. 18, 2020

(87) PCT Pub. No.: WO2019/120648
PCT Pub. Date: Jun. 27, 2019

(65) Prior Publication Data
US 2021/0071729 A1    Mar. 11, 2021

(30) Foreign Application Priority Data

Dec. 19, 2017 (DE) ............... 10 2017 130 491.6

(51) Int. Cl.
F16D 69/02 (2006.01)
(52) U.S. Cl.
CPC ........ F16D 69/026 (2013.01); F16D 69/023 (2013.01); F16D 69/028 (2013.01);
(Continued)

(58) Field of Classification Search
CPC .... F16D 69/026; F16D 69/023; F16D 69/028; F16D 2200/0052; F16D 2200/0065
See application file for complete search history.

(56) References Cited

U.S. PATENT DOCUMENTS

2003/0200898 A1* 10/2003 Ohe ............... F16D 69/026
106/36
2005/0004258 A1   1/2005 Yamamoto et al.
(Continued)

FOREIGN PATENT DOCUMENTS

| EP | 2103833 A1 | 9/2009 |
| EP | 3070141 A1 | 9/2016 |
| WO | WO2011131227 A1 | 10/2011 |

OTHER PUBLICATIONS

International Search Report with English translation corresponding to PCT/EP2018/073994, dated Dec. 14, 2018, 16 pages.

*Primary Examiner* — Xuan Lan Nguyen
(74) *Attorney, Agent, or Firm* — Reising Ethington, P.C.

(57) ABSTRACT

A friction lining material mixture for brake or clutch linings, containing 8 to 22% by volume of binder, 3 to 20% by volume of organic fibers, 1 to 20% by volume of further organic compounds, 0 to 20% by volume of inorganic fibers, 5 to 50% inorganic oxides, 0 to 15% inorganic silicates, 1 to 20% inorganic sulfur or inorganic sulfur compounds, 0 to 10% metals or metal alloys and fillers, in particular petroleum coke and/or baryte. The friction linings produced from the friction lining material mixture are distinguished by excellent braking performance and excellent braking comfort and therefore combine the specific positive properties of both Low Steel (LS) and Non-Asbestos Organic (NAO) materials.

16 Claims, 1 Drawing Sheet

(52) U.S. Cl.
CPC .............. *F16D 2200/0052* (2013.01); *F16D 2200/0065* (2013.01)

(56) References Cited

U.S. PATENT DOCUMENTS

| | | | |
|---|---|---|---|
| 2006/0151268 A1* | 7/2006 | Kesavan | F16D 69/026 188/251 A |
| 2007/0219289 A1* | 9/2007 | Phipps | F16D 69/026 523/155 |
| 2008/0156226 A1* | 7/2008 | Kitami | F16D 69/026 106/36 |
| 2009/0011962 A1* | 1/2009 | Chinda | F16D 69/026 508/216 |
| 2009/0239076 A1 | 9/2009 | Yaguchi et al. | |
| 2010/0084232 A1 | 4/2010 | Subramanian | |
| 2010/0084233 A1 | 4/2010 | Subramanian | |
| 2016/0289126 A1 | 10/2016 | Kitami et al. | |

\* cited by examiner

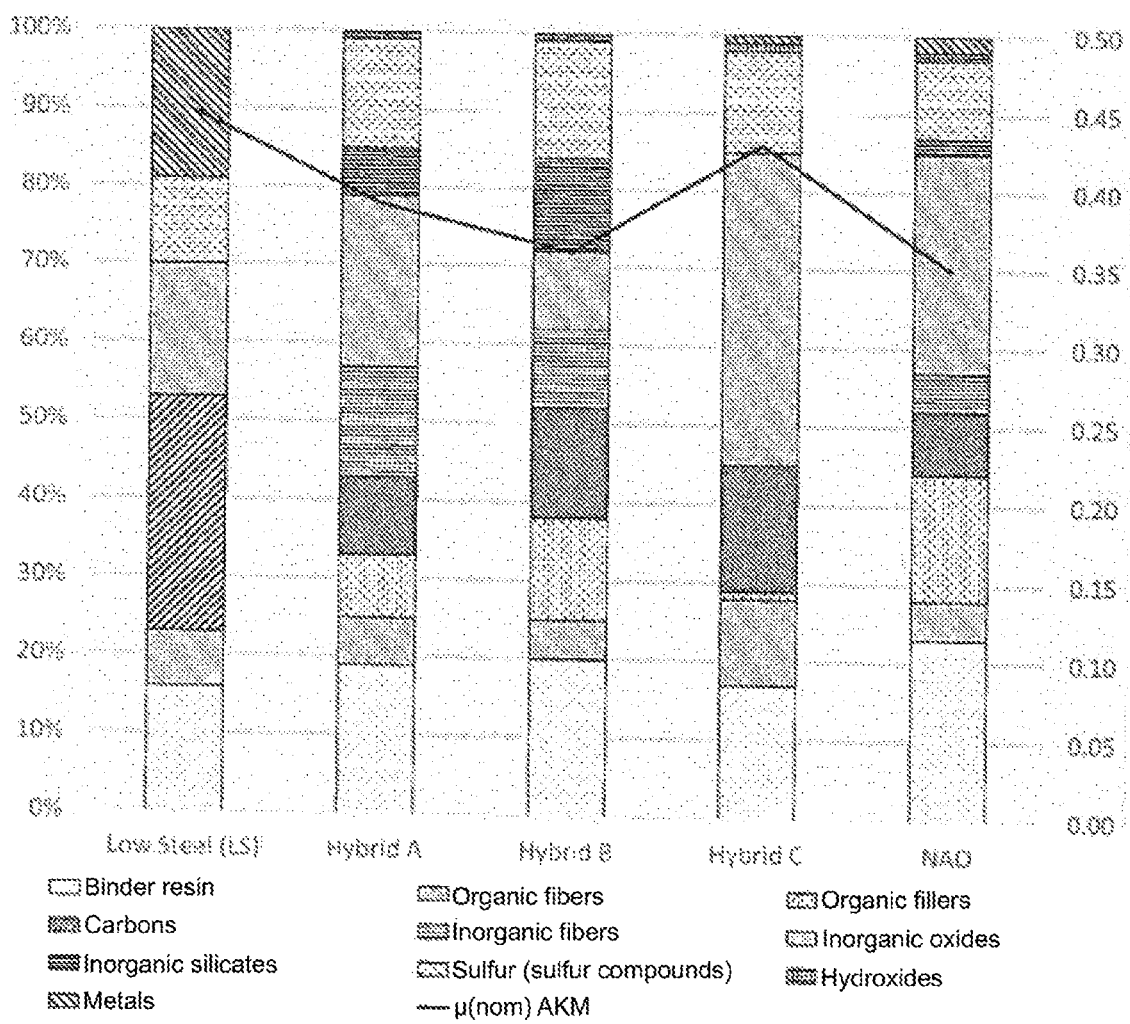

HYBRID FRICTION LINING MATERIAL, BRAKE LININGS PRODUCED FROM SAME AND METHOD FOR PRODUCING SAME

CROSS-REFERENCE TO RELATED APPLICATION

This application claims the benefit of the German Application 10 2017 130 491.6 filed on Dec. 19, 2017, the entire contents of which are hereby incorporated by reference.

FIELD

The present disclosure relates to a hybrid friction lining material mixture which combines the specific positive properties of static friction lining material (so-called Low Steel (LS) friction linings or friction lining material) and asbestos-free organic friction lining material (so-called Non-Asbestos Organic (NAO) friction linings or friction lining material). The present disclosure further relates to brake linings containing a carrier plate and a friction lining fastened to the carrier plate, wherein the friction lining is produced from the aforementioned hybrid friction lining material mixture. Finally, the present disclosure relates to a method for producing a brake lining using the aforementioned hybrid friction lining material mixture.

BACKGROUND

Friction lining mixtures are required for brake and clutch linings, for example for use in motor vehicles. Conventional friction lining formulations basically have the following schematic composition:
  metals (as fiber or powder)
  fillers (including any inorganic fibers)
  lubricants (solid lubricants) wherein, for example, metal sulfides, optionally also in combination with graphite, can be used as solid lubricant,
  organic constituents such as resins, rubber, organic fibers (e.g. aramid, polyacrylonitrile or cellulose fibers), and organic fillers.
The raw material groups are differently proportioned depending on the requirements profile.

Worldwide, two types of brake linings are mainly used in new cars. On the one hand, Low Steel (LS) brake linings with the highest braking power are also found in the case of strong mechanical and thermal loading. Even at a high speed, these brake linings, with their excellent tribological properties, offer a high level of safety.

The second group in question is the so-called Non-Asbestos Organic (NAO) brake linings. These are characterized by a high braking comfort, which means that they are significantly quieter in use and that they also cause significantly less soiling of wheel rims of the vehicles.

The specific material concept for the friction materials is a key factor for the different behavior of these two types. The specific combination of friction-effective raw materials and fillers in each case brings about a different weighting of the tribological main effects (abrasion and adhesion). A combination of the properties of both materials has hitherto not been possible.

US 2010/084233 and US 2010/084232 both relate to an asbestos-free (NAO) friction material for brakes which is substantially free of copper. The filler content in accordance with US 2010/084232 is 46 to 64% of the total composition. The filler material used may optionally be rubber powder, graphite, petroleum coke, baryte, friction dust and lime hydrate. Aramid fibers, polyacrylonitrile and cellulose fibers are used as fibers in the two cited documents, but steel fibers are not mentioned.

US 2005/004258 describes a friction lining material which is free of copper but contains stainless steel fibers. Graphite with a content of 7 to 15% by volume is used as filling material in US 2005/004258.

WO 2011/131227 further describes a Low Steel (LS) friction lining material for brake linings which is substantially free of copper. The carbon component is contained in the composition described therein in an amount of 36 to 51% by volume. Low steel friction lining compositions are intended for high pressure and high temperature applications and exhibit good material properties at high speeds. However, such low-steel friction lining material mixtures are disadvantageous in terms of braking comfort.

SUMMARY

It is therefore an object of the present disclosure to develop a novel friction material concept that combines the specific positive properties of both Low Steel (LS) and Non-Asbestos Organic (NAO) materials, that is, to provide a material that can provide both excellent braking performance and excellent braking comfort.

The present disclosure therefore relates to a hybrid friction lining material mixture for brake or clutch linings interacting with a friction partner made of gray cast iron or steel. The friction lining material mixture according to one embodiment combines the specific positive properties of static (Low Steel, LS) friction lining material and asbestos-free organic friction lining material (Non-Asbestos Organic (NAO)). The friction lining material mixture according to one embodiment comprises the following, in % by volume and based on the entire friction lining material mixture:
  (a) 8 to 22% of at least one binder,
  (b) 3 to 12% organic fibers or a mixture of organic fibers,
  (c) 1 to 20% of at least one further organic compound,
  (d) 0 to 20%, preferably 1 to 20%, inorganic fibers or a mixture of inorganic fibers,
  (e) 5% to 50% of at least one inorganic oxide,
  (f) 0 to 15%, preferably 5 to 15%, of at least one inorganic silicate,
  (g) 1 to 20% sulfur and/or at least one inorganic sulfur compound,
  (h) 8 to 18% carbon and/or at least one substantially carbon material, in particular selected from the group consisting of natural graphite, synthetic graphite, petroleum coke, desulfurized petroleum coke, carbon black, and any mixtures thereof,
  (i) 0.5 to 5% of at least one filler selected from inorganic hydroxides, and
  (j) 0 to 10% of at least one metal.

The at least one binder serves as a matrix and holds the other constituents of the friction lining material mixture together. A phenolic resin, an epoxy resin, a silicone resin or a nitrile resin, and any mixture of these resins may in principle be used or included in the friction lining material mixture, for example. In accordance with one embodiment, the binder comprises a modified phenol. The binder may also be or comprise a mixture of one or more straight-chain or modified phenolic resin system(s), wherein the phenolic resin system or systems preferably contain unmodified phenolic resins, silicone-modified resins, NBR-modified resins, phosphorus-modified resins and/or boron-modified resins.

In an alternative embodiment, a non-phenolic resin may also be used as a binder, or the binder may comprise one or more non-phenolic resins. Alternatively, the binder may also be or comprise a mixture of a phenolic resin and a non-phenolic resin.

In accordance with a preferred embodiment, the at least one binder is contained in the friction lining material mixture at a level of from 15 to 22% by volume, based on the total mixture.

The organic fibers included in the friction lining material mixture of the present disclosure may be of synthetic origin or of natural origin. According to one embodiment, polyacrylic fibers (PAN) polyaramid fibers/aramid fibers or cellulose fibers are used as organic fibers. Also included are any mixtures of the above-mentioned organic fibers, optionally also in combination with further organic or inorganic fibers. Aramid fibers preferably have an average length in the range of 0.9 mm to 1.3 mm. The preferred average length of PAN fibers is in the range of 5.0 mm to 7.5 mm, while cellulose fibers preferably have an average length of less than 1 mm. Particularly advantageous properties, in particular tribological properties, can be set by a combination of these types of fibers and/or of the preferred fiber lengths. In accordance with one possible embodiment, the organic fibers comprise no aramid fibers for environmental reasons.

In accordance with a preferred embodiment, the organic fibers, individually or in the form of a mixture of organic fibers, are contained in the friction lining material mixture in a proportion of 4 to 11% by volume, based on the total mixture.

The single or additional organic constituents or organic fillers which are comprised in the friction lining material mixture according to one embodiment preferably comprise resins, rubbers and/or phythalocyanines.

In accordance with a preferred embodiment, the additional organic constituents, individually or in the form of any mixture thereof, are contained in the friction lining material mixture in a proportion of from 1 to 15% by volume, based on the total mixture.

In accordance with one embodiment, the further organic constituents, individually or in the form of any mixture thereof, are contained in the friction lining material mixture in a proportion of 6 to 15% by volume, based on the total mixture.

In accordance with a further embodiment, the additional organic constituents, individually or in the form of any mixture thereof, are contained in the friction lining material mixture in a proportion of 1 to 5% by volume, preferably 1 to 3% by volume, based on the total mixture.

The inorganic fibers optionally included in the friction lining material mixture of the present disclosure may be metal fibers of any metal or metal alloy. They preferably have a length of 0.5 mm to 10 mm. Possible metal fibers are bronze fibers, copper fibers and steel fibers, in particular stainless steel fibers. Steel fibers and in particular stainless steel fibers can be used as a substitute for copper and/or titanates in the friction lining material mixture. Inorganic fibers may, however, also be mineral fibers, glass fibers or carbon fibers as well as any mixtures of these and the aforementioned metal fibers. In accordance with a preferred embodiment, the friction lining material mixture and thus also the friction lining are substantially free of asbestos fibers. Substantially free of asbestos fibers means within the meaning of the present disclosure that such fibers are contained in the friction lining material mixture at most with a proportion of 0.2% by volume, preferably of at most 0.1% by volume and very particularly preferably of 0% by volume, based on the total mixture.

In accordance with a preferred embodiment, the inorganic fibers, individually or in the form of a mixture of inorganic fibers, are contained in the friction lining material mixture in a proportion of 8 to 16% by volume, based on the total mixture.

In accordance with another preferred embodiment, the friction lining material mixture is substantially free of inorganic fibers, in particular metal fibers. Substantially free of inorganic fibers, in particular of metal fibers, means within the meaning of the present disclosure that such fibers are contained in the friction lining material mixture at most with a proportion of 0.2% by volume, preferably of at most 0.1% by volume and very particularly preferably of 0% by volume, based on the total mixture.

In accordance with a preferred embodiment, the fibers comprised in the friction lining material mixture are selected from the group consisting of polyacrylonitrile (PAN), polyaramids, cellulose fibers, mineral fibers and steel fibers, especially stainless steel fibers, and any mixtures thereof.

The inorganic oxides (component (e)) include, in accordance with a preferred embodiment, alumina, magnesium oxide (MgO) and zirconium oxide ($ZrO_2$). These preferred oxides can be included individually or in any combination with one another and/or with further inorganic oxides in the friction lining material mixture. A further example of inorganic oxides are the titanates, which are mixed oxides and which, for example, also naturally occur as titanium minerals.

In accordance with a preferred embodiment, the inorganic oxides, individually or in the form of a mixture of inorganic oxides, are contained in the friction lining material mixture in a proportion of 8 to 42% by volume, even more preferably 10 to 40% by volume, based on the total mixture.

According to the disclosure, it is very particularly preferred that magnesium oxide and/or zirconium oxide with a high proportion are contained in the friction lining material mixture. A high proportion means in particular a proportion of 8 to 42% by volume, even more preferably a proportion of 20 to 41% by volume. The magnesium oxide and/or the zirconium oxide then functions both as matrix-forming filler and as abrasive in the friction lining material mixture and in the friction lining.

In accordance with one embodiment, the friction lining material mixture is substantially free of titanates. Substantially free of titanates means within the meaning of the present disclosure that titanates are contained in the friction lining material mixture at most with a proportion of 0.2% by volume, preferably of at most 0.1% by volume and very particularly preferably of 0% by volume, based on the total mixture.

According to one embodiment, zirconium silicates and/or the layered silicate vermiculite are preferably used as inorganic silicates (component (f)). Both act as abrasives.

In accordance with a preferred embodiment, the inorganic silicates, individually or in the form of a mixture of inorganic silicates, are contained in the friction lining material mixture in a proportion of from 4 to 14% by volume, based on the total mixture.

In accordance with another preferred embodiment, the friction lining material mixture is substantially free of inorganic silicates. Substantially free of inorganic silicates means within the meaning of the present disclosure that inorganic silicates are contained in the friction lining material mixture at most with a proportion of 0.2% by volume, preferably of at most 0.1% by volume and very particularly preferably of 0% by volume, based on the total mixture.

According to one embodiment, the inorganic sulfur compounds of component (g) preferably comprise metal sulfides, in particular tin sulfides, zinc sulfides, iron sulfides, molybdenum sulfides, antimony trisulfide and metal sulfide complexes. These compounds may be included in the composition individually or in any combination with one another. The above-mentioned sulfur compounds act in particular as lubricants. The at least one inorganic sulfur compound is, in a further preferred embodiment, barium sulfate or baryte or comprises barium sulfate or baryte, respectively. The barium sulfate can be included in the friction lining material mixture according to one embodiment with a proportion of 1 to 20% by volume, preferably with a proportion of 8 to 18% by volume, even more preferably with a proportion of 11 to 16% by volume, based in each case on the total mixture. The barium sulfate may also be included in combination with the metal sulfides and/or metal sulfide complexes in the friction lining material mixture. In addition or as an alternative to the inorganic sulfur compounds, the friction lining material mixture may contain sulfur. The proportion of 1 to 20% by volume of the total mixture for sulfur and/or one or more inorganic sulfur compounds is also not exceeded in the above-mentioned mixtures.

In accordance with a preferred embodiment, sulfur or the inorganic sulfur compounds, individually or in the form of a mixture, are contained in the friction lining material mixture in a proportion of 11 to 17% by volume, based on the total mixture.

Inorganic hydroxides (component i) preferably comprise, magnesium or calcium hydroxide and any mixtures thereof.

In accordance with a preferred embodiment, the inorganic hydroxides, individually or in the form of a mixture of inorganic hydroxides, are contained in the friction lining material mixture in a proportion of 0.5 to 2% by volume, based on the total mixture.

Metals (component j) according to one embodiment preferably comprise iron, steel, copper, tin or zinc, but also metal alloys, such as bronze or brass. These and additional metals can be added to the composition in the form of a powder. Tin powder and/or zinc powder in particular can act as lubricants.

In accordance with a preferred embodiment, the metals or metal alloys, individually or in the form of a mixture of metals and/or metal alloys, are contained in the friction lining material mixture in a proportion of 0.5 to 2% by volume, based on the total mixture.

However, in accordance with a preferred embodiment, the friction lining material mixture is substantially free of metals or metal alloys. The friction lining material mixture is particularly preferably substantially free of copper or copper alloys. Substantially free of metals or metal alloys and substantially free of copper and/or copper alloys means within the meaning of the present disclosure that these are contained in the friction lining material mixture at most with a proportion of 0.2% by volume, preferably of at most 0.1% by volume and very particularly preferably of 0% by volume, based on the total mixture. The possible small proportions of metal, in particular copper or alloys thereof, can result from impurities of the other components with metals, for example with copper or copper alloys, such as bronze or brass.

In accordance with a preferred embodiment, the friction lining material mixture is substantially free of copper, copper alloys and titanates. Copper and titanates, for example hexatitanate and octatitanate, are expensive constituents because of the limited availability, but they can nevertheless impart advantageous tribological properties to the friction lining. Moreover, the use of copper is also disadvantageous for ecological reasons because copper is released by the abrasion of the brake lining and ejected into the environment. Thus, it may be advantageous to dispense with copper, copper alloys and/or titanates in the friction lining material mixture.

In accordance with one embodiment, the disclosure relates to a hybrid friction lining material mixture containing the following in % by volume of the friction lining material mixture:

(a) 15 to 22%, in particular 17 to 20%, of at least one binder,
(b) 5 to 11% organic fibers or a mixture of organic fibers,
(c) 1 to 15%, in particular 7 to 14% or 1 to 3% of at least one further organic compound,
(d) 0 or 8 to 16% inorganic fibers or a mixture of inorganic fibers,
(e) 10 to 40% of at least one inorganic oxide,
(f) 0% or 5 to 15%, in particular 6 to 12%, of at least one inorganic silicate,
(g) 13 to 15% sulfur and/or at least one inorganic sulfur compound,
(h) 10 to 16% carbon and/or at least one substantially carbon material, in particular selected from the group consisting of natural graphite, synthetic graphite, petroleum coke, desulfurized petroleum coke, carbon black,
(i) 1 to 1.5% of at least one filler selected from the group of inorganic hydroxides, in particular calcium hydroxide,
(j) 0 to 1% of at least one metal, in particular iron or an iron alloy.

A very particularly preferred composition for the friction lining material comprises 18 to 20% by volume of at least one binder, 5 to 7% by volume of organic fibers or a mixture of organic fibers, 7 to 9% by volume of at least one further organic constituent, 9 to 11% by volume of carbon or a substantially carbon material, 13 to 15% by volume of inorganic fibers or a mixture of inorganic fibers, 21 to 23% by volume of at least one inorganic oxide, particularly magnesium oxide and/or zirconium oxide, 5 to 7% by volume of at least one inorganic silicate, particularly zirconium silicate and/or vermiculite, 13 to 15% by volume of sulfur and/or at least one inorganic sulfur compound and 0 to 2% by volume of at least one inorganic hydroxide. The % by volume proportions of the individual components are each selected in such a way that, optionally together with additional optional constituents, 100% by volume results in total. Apart from possible, unavoidable impurities, this particularly preferred composition contains no metals or metal alloys (component (j)).

In accordance with a preferred embodiment, the composition consists of the components mentioned in the above section. Their % by volume proportions again result in 100% by volume in total. Even if the composition consists only of these components, it should not be excluded according to the invention that customary impurities, preferably with a proportion of at most 2% by volume, can be contained in the composition.

Another very particularly preferred composition for the friction lining material comprises 19 to 21% by volume of at least one binder, 4 to 6% by volume of organic fibers or a mixture of organic fibers, 12 to 14% by volume of at least one further organic constituent, 13 to 15% by volume of carbon or a substantially carbon material, 9 to 11% by volume of inorganic fibers or a mixture of inorganic fibers, 9 to 11% by volume of at least one inorganic oxide, particularly magnesium oxide and/or zirconium oxide, 11 to 13% by volume of at least one inorganic silicate, particularly zirconium silicate and/or vermiculite, 14 to 16% by volume of sulfur and/or at least one inorganic sulfur compound and 0 to 2% by volume of at least one inorganic hydroxide. The % by volume proportions of the individual components are each selected in such a way that, if required, 100% by volume results in total, together with additional optional constituents. Apart from possible, unavoidable impurities, this particularly preferred composition contains no metals or metal alloys (component (j)).

In accordance with a preferred embodiment, the composition consists of the components mentioned in the above section. Their % by volume proportions again result in 100% by volume in total. Even if the composition consists only of these components, it should not be excluded according to one embodiment that customary impurities, preferably with a proportion of at most 2% by volume, can be contained in the composition.

Another very particularly preferred composition for the friction lining material comprises 16 to 18% by volume of at least one binder, 10 to 12% by volume of organic fibers or a mixture of organic fibers, 0 to 2% by volume of at least one further organic constituent, 15 to 17% by volume of carbon or at least one material consisting substantially of carbon, 39 to 41% by volume of at least one inorganic oxide, in particular magnesium oxide and/or zirconium oxide, 12 to 14% by volume of sulfur and/or at least one inorganic sulfur compound, 0 to 2% by volume of at least one inorganic hydroxide and 0 to 2% by volume of at least one metal. The % by volume proportions of the individual components are each selected in such a way that if required, together with further optional constituents, 100% by volume result in total. This particularly preferred composition, apart from possible, unavoidable impurities, contains no inorganic fibers (component (d)) and no inorganic silicates (component (f)).

In accordance with a preferred embodiment, the composition consists of the components mentioned in the above section. Their % by volume proportions again result in 100% by volume in total. Even if the composition consists only of these components, it should not be excluded according to one embodiment that customary impurities, preferably with a proportion of at most 2% by volume, can be contained in the composition.

With regard to particular preferred or exemplary raw materials for the individual components of these particularly preferred embodiments, reference is made to the above statements relating to the individual components.

The friction lining material mixtures according to one embodiment thus comprise the binder and filler as a structurer and as carrier material for the further functional formulation constituents, such as abrasives, lubricants or metals. Their tribological function or effect is influenced by interactive effects from the respective carrier. Preferred lubricants according to the invention are at least one metal sulfide, for example tin sulfide, zinc sulfide, iron sulfide or molybdenum sulfide, organic lubricants or metal lubricants, such as tin or zinc powder, and any combinations thereof. The lubricant may also be a metal sulfide complex.

The novel hybrid material concept according to the disclosure is characterized by a modification of the proportion of organic constituents in the friction lining material mixture. Furthermore, the novel hybrid material concept is characterized by the use of magnesium oxide and/or zirconium oxide or zirconium oxide as a filler in combination with the further filler component (h) and/or in combination with barium sulfate or baryte. This combination forms the so-called backbone of the friction lining material mixture.

According to one embodiment, the filler component (h) is contained in an amount of 8 to 18% by volume, preferably in an amount of 10 to 16% by volume, and is either carbon or at least one material consisting substantially of carbon. The substantially carbon material is preferably selected from the group consisting of natural graphite, synthetic graphite, petroleum coke, and carbon black. Alternatively, the friction lining material mixture according to one embodiment comprises baryte or barium sulfate or a mixture of one or more of the above-mentioned filler components (h) with baryte or barium sulfate as the main filler. In accordance with a preferred embodiment, the main filler (backbone) of the friction lining material mixture has been modified compared to the prior art in that the new main filler is formed substantially from a mixture of magnesium oxide (MgO) in combination with carbon and/or a material consisting substantially of carbon, in particular petroleum coke and/or in combination with baryte. Furthermore, in comparison with the prior art, the abrasives according to the disclosure have been modified in such a way that they are "milder abrasives" according to one embodiment.

In accordance with a further aspect, the disclosure therefore also relates to brake linings containing a carrier plate and a friction lining fastened to the carrier plate, wherein the friction lining is produced from the hybrid friction lining material mixture according to one embodiment.

Finally, the disclosure also relates to a method for producing a brake lining, comprising the following steps:
Mixing at least one binder,
fibers or a mixture of fibers,
of at least one lubricant,
of at least one abrasive and filler to form a homogeneous mixture with a composition based on the total volume of the hybrid friction lining material mixture as defined in one of the examples above,
Compressing the homogeneous mixture under a pressure of 4 to 25 tons/piece at room temperature to form a friction lining from the mixture,
Compressing the friction lining and a carrier plate under a pressure of 5 to 50 tons/piece at a temperature of 129 to 146° C.,
Baking the pressed friction lining and carrier plate at a temperature of 166 to 288° C.

DESCRIPTION OF THE FIGURE

Illustrative embodiments will hereinafter be described in conjunction with the following FIGURE, wherein like numerals denote like elements, and wherein the FIGURE shows the characteristics of the various hybrid material classes of the present disclosure, namely Hybrid A, Hybrid B, Hybrid C as compared to a Low Steel and NAO friction lining material composition.

DESCRIPTION OF ILLUSTRATIVE EMBODIMENTS

Based on experience made in previous developments on conventional, known materials and also in the context of basic studies relating to the tribological behavior of raw materials, the idea was born to develop a new hybrid friction material concept. In terms of formulation, the aforementioned material concepts LS and NAO can be distinguished by their main strand (backbone). The backbone is basically the "main filler" of a formulation and thus serves firstly as a structurer and secondly as a carrier material for further functional formulation constituents, such as abrasives, lubricants or metals. Their tribological function or effect is influenced by interactive effects of the respective backbone. This becomes clear, for example, when compared to copper, which was tested in tribological fingerprinting in the LS backbone and also in the NAO backbone. Similarly different behavior can be found for almost all raw material groups in friction material formulations. Through the targeted development of a modified backbone in combination with specific variations of the functional formulation constituents already mentioned above, it has been possible to achieve the desired properties. The friction lining material mixtures and friction linings according to the disclosure are distinguished by both outstanding braking performance and excellent braking comfort. In particular, the friction linings prove to be advantageous in terms of brake shrinkage, heat wear resistance, brake rubbing and squeaking. Moreover, the friction linings have a long service life and a reduced formation of wheel dust occurs.

The invention will be explained in more detail below.

The hybrid friction lining material according to the disclosure is explained in more detail in the following examples. There, the material of the present disclosure is referred to as hybrid A, hybrid B, and hybrid C. The following compositions in accordance with the example of hybrid A, hybrid B and hybrid C were prepared in a standard mixer for approximately 10 minutes and then placed in a molding press and baked according to the prior art.

TABLE 1

| | Raw material classes | | |
|---|---|---|---|
| | Hybrid A Example | Hybrid B Example | Hybrid C Example |
| Resin/binder | 19 | 20 | 17 |
| Organic fibers | 6 | 5 | 11 |
| Additional organic component(s) | 8 | 13 | 1 |
| Carbon (petroleum coke) | 10 | 14 | 16 |
| Inorganic fibers | 14 | 10 | 0 |
| Inorganic Oxides[1] | 22 | 10 | 40 |
| Inorganic silicates[2] | 6 | 12 | 0 |
| Inorganic sulfur or inorganic sulfur compounds | 14 | 15 | 13 |
| Inorganic Hydroxides (CaOH$_2$) | 1 | 1 | 1 |
| Metals/metal alloys | 0 | 0 | 1 |

The values are rounded % by volume values.
[1]The inorganic oxides are alumina, magnesium oxide, zirconium dioxide.
[2]The inorganic silicates[2] are zirconium and vermiculite.

The material classes (A) to (C) showed the following properties:

TABLE 2

| | Hybrid A | Hybrid B | Hybrid C |
|---|---|---|---|
| Mean µ value | 0.38-0.40 | 0.34-0.36 | >0.40 |
| HFT stability | Adequate | Adequate | Very good |
| µ value - recovery | Very good | Good | Very good |
| µ value in AKM | Stable | Stable | Stable |
| Lifespan of friction lining | Good | Good | Very good |
| Lifespan of rotor | Good | Good | Adequate |

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A hybrid friction lining material mixture of a static friction lining material (Low Steel (LS)) and an asbestos-free organic friction lining material (Non-Asbestos Organic (NAO)) for brake and clutch linings interacting with a friction partner of gray cast iron or steel, comprising the following in volume % of the friction lining material mixture:
   (a) 15 to 22% of at least one binder,
   (b) 5 to 11% organic fibers or a mixture of organic fibers,
   (c) 1 to 20% of at least one further organic compound,
   (d) 0 to 16% inorganic fibers or a mixture of inorganic fibers, wherein the inorganic fibers are selected from the group consisting of bronze fibers, copper fibers, steel fibers, stainless steel fibers, mineral fibers, glass fibers, carbon fibers, or any mixtures thereof,
   (e) 10 to 40% of at least one inorganic oxide, wherein the at least one inorganic oxide is selected from the group consisting of aluminum oxide (alumina), magnesium oxide (MgO), zirconia, or any mixtures thereof,
   (f) 5 to 15% of at least one inorganic silicate, wherein the at least one inorganic silicate is zirconium and/or vermiculite,
   (g) 13 to 15% sulfur and/or at least one inorganic sulfur compound, which comprises barium sulfate,
   (h) 10 to 16% carbon and/or at least one carbon material selected from the group consisting of natural graphite, synthetic graphite, petroleum coke, desulfurized petroleum coke, carbon black and any mixtures thereof,
   (i) 1 to 1.5% of at least one filler selected from inorganic hydroxides, which comprises magnesium or calcium hydroxide,
   and
   (j) 0 to 10% of at least one metal added in the form of a powder.

2. The hybrid friction lining material mixture according to claim 1, characterized in that the friction lining material mixture is substantially free of copper and/or copper alloys.

3. A hybrid friction lining material mixture as claimed in claim 1 comprising the following in volume % of the friction lining material mixture:

(a) 17 to 20% of the at least one binder,
(c) 8 to 14% of the at least one further organic compound, and
(f) 6% to 12% of the at least one inorganic silicate.

4. The hybrid friction lining material mixture according to claim 1, wherein a main filler backbone is a mixture of 10 to 40% magnesium oxide and 10 to 16% petroleum coke.

5. The hybrid friction lining material mixture according to claim 1, wherein the binder is a modified phenol.

6. The hybrid friction lining material mixture according to claim 1, wherein the binder comprises a mixture of one or more straight-chain or modified phenolic resin systems.

7. The hybrid friction lining material mixture according to claim 1, wherein the binder is a non-phenolic resin.

8. The hybrid friction lining material mixture according to claim 1, wherein the binder is a mixture of a phenolic resin with a non-phenolic resin.

9. The hybrid friction lining material mixture according to claim 1, wherein the binder comprises one or a mixture of one or more straight-chain or modified phenolic resin systems comprising unmodified phenolic resins, silicone-modified resins, nitrile rubber-(NBR)-modified resins, phosphorus-modified resins and boron-modified resins.

10. The hybrid friction lining material mixture according to claim 1, wherein the fiber is selected from the group consisting of polyacrylonitrile (PAN), polyaramids, cellulose fibers and steel fibers and/or stainless steel fibers.

11. The hybrid friction lining material mixture according to claim 1, wherein the hybrid friction lining material mixture comprises at least one metal sulfide, organic lubricants and/or metal lubricants.

12. The hybrid friction lining material mixture according to claim 1, wherein the at least one inorganic sulfur compound of component (g) comprises metal sulfides.

13. The hybrid friction lining material mixture according to claim 12, wherein the at least one inorganic sulfur compound of component (g) comprises tin sulfides, zinc sulfides, iron sulfides, molybdenum sulfides, antimony trisulfide, metal sulfide complexes, or any combination thereof.

14. A brake lining, comprising:
a carrier plate, and
a friction lining affixed to the carrier plate, wherein the friction lining is produced from a hybrid friction lining material mixture according to claim 1.

15. The hybrid friction lining material mixture according to claim 2, wherein the hybrid friction lining material mixture is substantially free of titanates.

16. The hybrid friction lining material mixture according to claim 1, comprising 8 to 16% inorganic fibers or the mixture of inorganic fibers.

* * * * *